United States Patent [19]
Williams

[11] Patent Number: 4,901,635
[45] Date of Patent: Feb. 20, 1990

[54] APPARATUS AND METHOD FOR THE CONTINUOUS EXTRUSION AND PARTIAL DELIQUEFACTION OF OLEAGINOUS MATERIALS

[75] Inventor: Maurice A. Williams, Brookpark, Ohio

[73] Assignee: Anderson International Corp., Cleveland, Ohio

[21] Appl. No.: 179,486

[22] Filed: Apr. 8, 1988

[51] Int. Cl.$^4$ .......................... A23N 1/00; A47J 27/00

[52] U.S. Cl. ........................................ 99/483; 99/348; 99/495; 99/516; 100/938; 100/117; 260/412.2; 366/88; 366/323; 425/208

[58] Field of Search ................. 99/495, 483, 509, 510, 99/348, 516, 536, 348; 100/117, 938, 145, 148; 366/318, 324, 80, 90, 88, 323; 425/208, 209, 73, 84; 260/412.2

[56] References Cited

U.S. PATENT DOCUMENTS

| | | | |
|---|---|---|---|
| 2,119,162 | 5/1938 | Hartner | 99/495 X |
| 2,249,736 | 7/1941 | Anderson | 100/45 |
| 3,108,530 | 10/1963 | Zies | 99/323.9 |
| 3,159,457 | 12/1964 | Zies | 422/268 |
| 3,222,797 | 12/1965 | Zies | 260/412.2 |
| 3,255,220 | 6/1966 | Baer et al. | 260/412.2 |
| 3,574,891 | 4/1971 | Bredeson et al. | 425/192 R |
| 3,672,641 | 6/1972 | Slaby | 425/73 |
| 3,814,563 | 6/1974 | Slaby et al. | 100/117 X |
| 3,981,658 | 9/1976 | Briggs | 34/14 |
| 4,007,545 | 2/1977 | Briggs | 425/205 |
| 4,024,168 | 5/1977 | Homann et al. | 100/117 X |
| 4,271,754 | 6/1981 | Homann . | |
| 4,361,081 | 11/1982 | Howard | 99/348 |
| 4,373,434 | 2/1983 | Alexander et al. . | |
| 4,380,496 | 4/1983 | Maffet | 100/148 X |
| 4,498,382 | 2/1985 | Pera et al. | 100/117 |
| 4,581,992 | 4/1986 | Koch | 366/90 X |
| 4,646,631 | 3/1987 | Ward | 99/483 |

FOREIGN PATENT DOCUMENTS

| | | |
|---|---|---|
| 1163892 | 9/1969 | United Kingdom . |
| 1359013 | 7/1974 | United Kingdom . |

*Primary Examiner*—Timothy F. Simone
*Attorney, Agent, or Firm*—Tarolli, Sundheim & Covell

[57] ABSTRACT

An extruder for treating high-oil-content material such as certain oilseeds, is used to prepare the material for later solvent extraction of oil from the material. The extruder has an elongate barrel and a rotating wormshaft therein which advances the material from an inlet hopper to a discharge die plate having at least one restricted orifice. As the material advances through a series of compaction worms, it is worked and compressed. Steam may be injected to raise the temperature and moisture content of the material. The pressure on the material is increased and is maintained sufficiently high so as to prevent any water content from vaporizing even if its vapor pressure significantly exceeds atmospheric pressure. The barrel wall includes a perforate or slotted section downstream from a solid wall section, and preferably immediately before or close to the discharge die plate. This allows any oil which is liberated from the oil-bearing material being worked to drain out of the extruder, thus making it feasible to process high-oil-content materials in the extruder without the prior use of a screw press. The material exiting the die plate into atmospheric pressure expands because of vaporization of the moisture content, yielding a porous material very suitable for solvent extraction. The feed worm design provides for greatly increased throughput of material from the feed hopper to the compaction worm.

28 Claims, 5 Drawing Sheets

APPARATUS AND METHOD FOR THE CONTINUOUS EXTRUSION AND PARTIAL DELIQUEFACTION OF OLEAGINOUS MATERIALS

BACKGROUND OF THE INVENTION

1. Field of the Invention

This invention relates to an apparatus for the extrusion of oleaginous plant materials, or oilseeds, as a preparatory step to solvent extraction of oil from the oilseeds. In particular, this invention relates to an extruder having means for draining oil liberated from the plant material during the extrusion of the material.

A standard method of obtaining oil from oleaginous materials such as oilseeds in solvent extraction. Extrusion is sometimes used as a preparatory step to improve the properties of the material which is treated in large-scale commercial solvent extraction systems. For example, oleaginous plant materials like rice bran, which are troublesome in solvent extraction because of their fine particulate nature which retards the flow of solvent through the material thereby reducing the efficiency of the extractor, are converted by extrusion into porous collets which allow for much faster flow of solvent through the material. Other oleaginous plant materials, such as soybean, are often flaked prior to solvent extraction, but the flakes have a low bulk density and tend to fall apart during solvent extraction, preventing an adequate drainage of solvent from the solids residue (marc) leaving the extractor. Extrusion converts the flakes into porous collets having greater bulk density than flakes, which allows for an increase of capacity flowing through the extractor without changing the bed depth or extraction time within the extractor. The collets have greater strength than flakes and do not fall apart so easily, which allows the marc to drain better before it exits the extractor.

Some oleaginous plant materials contain high levels of oil, or fat, as, for example, peanuts, safflower, rapeseed or canola, and copra. These materials are typically crushed in screw presses as a first step, to help rupture the cells containing the oil and to remove from the material a significant portion of the oil. The partially de-oiled residue is then cracked, or flaked, and sent directly to a solvent extractor, or it is processed through an extruder first before going to the extractor to attain larger, firmer, collets and/or to attain higher bulk densities.

Extrusion has been very effective in improving the solvent extractability of many oleaginous plant materials and is well established in the preparation of soybean, rice bran, cottonseed, and prepressed canola, sunflower and other oilseeds. There are, however, some problems in the extrusion of some oleaginous plant materials.

One problem with present extruders is that, if the oil or fat level of the material going into the extruder is above about 30% by weight, some of the oil is liberated within the extruder. This interrupts the steady-state operation of the extruder by creating pockets of free oil randomly spaced within the matrix of solid residue. The pockets of free oil exit the extruder at high velocity and interrupt the flow of collets. This also causes an undesirable loss of oil, the oil being the principal product sought during solvent extraction.

Another problem with extruders currently used in the oilseed industry is related to the low bulk density of the flaked material entering the extruder. When extruders are used to process materials besides oilseeds, for example, pet foods, the material being fed into the extruder is granular and at a relatively high bulk density, around forty pounds per cubic foot. For the treatment of oilseeds, on the other hand, the feed is usually flaked, and is therefore at a lower bulk density, around twenty-five pounds per cubic foot, because of the air voids between the flakes. Thus, because of the shape of the flakes, a great deal of air is drawn into the extruder along with the solids. This is a handicap because the feed worm thus cannot feed enough solids to the compaction worms in order to utilize the full capacity of the extruder and the total applied horsepower. This combination of low bulk density and the presence of air causes oilseed extruders to operate at a lower overall capacity than they otherwise could were the solids throughput or efficiency of the feed worm increased.

2. Description of the Prior Art

For a long time prior to and after World War II, the traditional methods of recovering oil from oil bearing materials, both vegetable and animal materials, were (i) screw pressing to residual oil levels of approximately 3% to 10% by weight of the pressed residue, or (ii) direct extraction in solvent extractors to a residual oil level below 1%.

A typical screw press is described in U.S. Pat. No. 2,249,736. The screw press is an apparatus having a rotating shaft within a cylindrical barrel having slotted walls. The shaft exerts pressure upon the oleaginous plant or animal tissue material by trying to force it through a restricted opening at the discharge end of the barrel. The pressure releases the oil from the cells contained in the tissue by rupturing the cells. The liberated oil flows out through the slotted walls of the barrel.

A typical solvent extraction apparatus is described in U.S. Pat. No. 3,159,457. The material to be treated is transported into moving baskets which pass under piping which sprays solvent into the baskets. This causes the oil to be dissolved and leached out of the oil-bearing material. This type of extractor, the percolation basket extractor, is the type most commonly used in the extraction of oil from oleaginous plant and animal materials.

However, many oilseeds cannot be directly extracted because the oil is bound too tightly within the plant tissue; because the plant tissue lacks strength when it is reduced in size to form thin flakes suitable for extraction; or because its oil level is high enough to interfere with the formation of flakes. A procedure was therefore developed involving the combination of screw pressing and solvent extraction, wherein the high-oil-containing, hard-to-extract material, was first passed through a screw press and subjected to mild pressing in order to lower the residual oil to a level equal to about one-fourth of the total protein content of the material. The action of the press helped to liberate the oil from the plant tissues and helped to convert some of the constituents within the plant material into a gel-like state which imparted greater strength to the material when it was formed into flakes subsequent to the screw pressing. Such a method is described in U.S. Pat. No. 2,551,254. This method allowed for some oilseeds, that were previously full-pressed to low residual oil levels using high compression screw presses, to be processed at higher volumes, in a less labor-intensive procedure.

By the early 1960's the labor and maintenance requirements of screw presses rose high enough to stimulate an interest in procedures that would allow for the elimination of screw pressing altogether For example, one major oilseed that had been pre-pressed and solvent extracted (cottonseed), was now flaked and sent directly to solvent extraction. Direct extraction required a longer extraction time, and didn't result in as low a residual oil level as pre-press solvent extraction did, but it was considered a step forward because it phased out the labor-intensive screw presses Oleaginous plant materials have since then for a number of years been formed into porous collets prior to solvent extraction, by means of extrusion using extruders that have closed barrels. An example of an extruder used for this application is described in U.S. Pat. No. 3,108,530. An example of the procedure for forming the collets, and inactivating enzymes, etc., is described in U.S. Pat. No. 3,255,220.

In an extruder, the solid matter of the material passes through the extruder and is subjected to increasing pressure and temperature as it is worked towards the discharge end, and, by the time the material reaches the discharge end, it is compacted into a compressed mass. The entire mass of material flows through at least one orifice on the discharge die plate of the extruder into normal atmospheric pressure.

When the material flows out of the extruder into atmospheric conditions, it may expand because of the vaporization of moisture contained in the tissue. There is some swelling of the material due to the sudden drop in pressure as it leaves the extruder, but "expansion", as the term is used herein, is caused by the production of minute pores and cavities by the vaporization of moisture contained within the tissue of the oilseed material. These pores and cavities cause the material to become permeable. The material is thus made quite suitable for solvent extraction.

Inside the extruder, the material is heated to a point where the vapor pressure of the water content of the material is significantly in excess of atmospheric pressure; the water, however, is held in the liquid phase by the pressure of compaction within the extruder. When the material exits the extruder into atmospheric conditions, some of the water instantly vaporizes. This occurs wherever the water is, and the water is distributed evenly throughout the material.

The amount of water that vaporizes is dependent upon the temperature of the material. It takes approximately 970 BTUs to vaporize one pound of water at atmospheric conditions. The BTUs come from the heat of the extruded material. For the liberation of 1 BTU, the temperature of one pound of water, or approximately two pounds of fat, or approximately four pounds of solids, must be lowered one degree Fahrenheit. One can calculate how many BTUs are available for vaporization by multiplying the drop in temperature (from extrusion temperature to atmospheric temperature) by 1 BTU for each pound of water, $\frac{1}{2}$ BTU for each pound of fat, and $\frac{1}{4}$ BTU for each pound of solids contained in the material being extruded. The amount of BTU's per hour that are available is then divided by 970 to come up with the pounds of water that will vaporize per hour. It is this vaporization of water that is the driving force causing the "expansion" of the material.

The heat input into the material comes from the injected steam and from friction generated by the shaft. The heat from steam is blended into the material a short distance downstream of the steam valves, but the heat generated by friction arises all along the surface of the shaft, with the major portion of it occurring near the downstream end of the shaft where the compaction is greatest. In order to monitor operating conditions, there is usually a thermometer, such as a dial thermometer, placed in the breaker screw position preceding the last compaction worm. Although this is a convenient place to locate a thermometer, it does not detect the highest temperature attained in the extruder. The highest temperature is attained after the last compaction worm, with some additional frictional heat generated as the material is forced to flow against the drag of the dies.

Therefore, it is possible to "expand" a product, yet register a temperature at the thermometer lower than the boiling temperature of water under atmospheric conditions. Applicant has observed an expander in operation on soybean making an acceptably "expanded" product with a temperature of 190° F. (87.7° C.) registering on the dial thermometer. It should be understood that, regardless of the temperature displayed on the thermometer, "expansion" to produce a porous interior cannot occur unless the vapor pressure of the contained water, or other volatile constituent, significantly exceeds the vapor pressure of that constituent under the atmospheric conditions prevailing when the material exits through the dies.

In the mid 1960's, the use of an extruder to prepare oleaginous plant materials, as mentioned above, was first applied on rice bran for the agglomeration of the finely divided rice bran fragments into porous collets and for the inactivation of the enzyme lipase, which caused a rapid deterioration of the rice oil.

During the 1970's, extrusion began to be applied to soybeans. Soybeans up to that time had been flaked and sent directly to solvent extraction. There were no particular technical problems with the direct extraction of soybean; it was considered an easy material to directly extract because it was fairly low in oil (18%) and was easily rolled into thin, durable flakes. But some processing plants were looking for means to increase their soy oil production beyond the capacity rating of the extraction equipment. Extrusion of the soybean flakes, to convert the flakes into collets having greater bulk density than the flakes and less tendency than flakes to fall apart into fine particles, allowed a plant to achieve a 50% to 100% increase in capacity. The use of extrusion thus spread rapidly in the soybean crushing industry during the 1970's.

Soybean and rice bran both contain less than 20% by weight of oil, and present no problems with the liberation of free pockets of oil during extrusion. Soybean, with about 18% oil, would have some of the oil liberated inside the extruder, causing the extrudate exiting the extruder to be sometimes covered with a frothy coating of oil containing a foam of boiling water as some of the moisture escaped from the solid matrix. After an initial flashing of moisture, the extrudate would cool and the boiling cease, and the oil would then be reabsorbed into the solid material.

Such extruders, as described above, all find application on oilseed materials containing less than approximately 30% oil by weight. If an oilseed containing more than about 30% oil by weight is processed in such an extruder, however, there is a likelihood that some of the oil will be liberated within the extruder and not reabsorbed, forming pockets of free oil which squirt out of the dies and interrupt the steady-state operation of the extruder. If this problem is encountered to a minor degree, it may be corrected by adding some finished meal, from which the oil has already been extracted, into the inlet of the extruder to mix with the incoming material and dilute its oil level down to a point where all of the liberated oil will be reabsorbed into the solids. If this problem is encountered to a major degree, the oil level must first be reduced by pressing the material in a screw press before sending it through the extruder Rapeseed (containing about 42% oil by weight) and other oilseeds, with oil levels higher than above 30%, therefore do not readily lend themselves to extrusion because of this problem, but must be screw pressed first to around a 15–25% oil level and then extruded. However, there is a strong interest in the oilseed crushing industry to phase out screw presses completely because they are perceived as high-wear, labor-intensive, and low-capacity devices.

Thus, it has become desirable to find a way to process material having a high oil content, in an extruder, without having to put it through a separate screw press first.

U.S. Pat. No. 4,361,081 describes an extruder for processing oilseed and having a perforated barrel wall section for drainage of oil therefrom. This patent, however, does not make any reference to extrusion of material at a high enough pressure to keep any water in a liquid phase until it exits the die plate. Thus, this apparatus does not provide for the expansion (of the compressed material) and porosity caused by vaporization of moisture content, which are so desirable for later solvent extraction.

A screw press modified to include an extrusion chamber at the discharge end has recently been introduced to the oilseed crushing industry. It is described in U.S. Pat. No. 4,646,631. It is substantially a screw press, very similar to the screw presses already in use for pre-pressing oilseed materials, but having a closed wall section at the end of the press with a die plate for product discharge rather than the annular choke mechanism most screw presses employ. The oilseed material is processed through the screw press section in much the same way it would be through a stand-alone screw press, pressing at the same moisture-temperature conditions and to the same residual oil level. Then, when the material continues downstream past the screw press section and enters the extruder section, moisture is injected to elevate the moisture level closer to that commonly used in extrusion; and the moistened material is extruded through die openings similar to those used in conventional extruders, with vaporization of any water which has been kept in the liquid phase because of high pressures in spite of temperatures over 100° C. The idea is to try to combine both devices, a screw press and an expander/extruder, onto a single shaft so that one machine can take the place of both.

There are a number of inherent difficulties with a device as described in U.S. Pat. No. 4,646,631, however. First, the device is still primarily a screw press and still has the inherent shortcomings of a screw press, namely that it is a high-wear, labor-intensive, and low-capacity device. Moreover, it is difficult to select a compromise rotational speed for the common shaft. Stand-alone expander/extruder shafts generally rotate 4 to 6 times faster than stand-alone screw press shafts. For example, typical expander/extruder shafts rotate at 220 to 440 RPM, whereas screw press shafts rotate from 35 to 100 RPM.

It is also difficult to match the horsepower expended into the product by the two machines Screw pressing to 15–25% oil typically consumes 0.9 to 2.0 HpD/ton. (Horsepower-Days/ton can be illustrated by the following: A capacity of 100 tons per day [of material entering the screw press] would require the consumption of 90 to 200 hp. A known press is rated for 170–200 T/D cottonseed or sunflower seed, which would pass 125–160 T/D of meats into the screw press and which requires a 225 Hp motor. 225 Hp/160 T/D=1.4 HpD/ton power consumption.) Extrusion, on the other hand, does not consume as much horsepower. Its power consumption is typically 0.2 to 0.5 HpD/ton. A 225 Hp expander/extruder could, therefore, have a capacity of 450 to 1,125 tons/day, much greater than that of an equivalently powered screw press.

An extruder consumes less horsepower than a screw press because the oilseed material is at a higher moisture level all the way through the extruder. This elevated moisture level makes the oilseed less abrasive, and this factor, coupled with the reduced horsepower consumption, makes an extruder less subject to wear than a screw press, and less subject to maintenance because of wear. And, because of the faster rotational speed, and lower horsepower requirement, a relatively inexpensive machine can have a considerably higher throughput than a screw press of the same cost.

A screw press also requires more operator attention than an extruder. A screw press generally is equipped with an adjustable choking mechanism located at the discharge end of the barrel serving as a means to enlarge or reduce an annular opening through which the solid residue exits the press. When the choke is opened, pressure is reduced. When it is closed, pressure is increased, more oil is pressed out, and the solid residue is harder and more compacted. The choke is opened to facilitate start-up and shutdown, and is adjusted during operation to cause enough pressure to bring the residual oil level into an acceptable range. If the residual oil level drifts, because of a drift in the moisture, temperature, or purity of the material entering the press, the choke is adjusted to compensate for it. Also, when pressing to a 15 to 25% residual oil level, there is sufficient pressure exerted within the screw press to cause some of the solids to flow out with the oil. These tend to accumulate on the exterior of the barrel drainage areas, and have to be scraped off manually by the operator.

Extrusion, on the other hand, requires less operator attention. Fixed dies are used rather than an adjustable choke, because an extruder is less sensitive to drift than a screw press. Steam is injected into an extruder to adjust for optimum product. If drift occurs, the steam flow can be readjusted, the concern being to add enough steam to prevent the main drive motor from overloading. Since motor amps are easily measured on stream, whereas residual oil cannot be measured on stream, it is easy to provide an automatic controller which will automatically adjust steam flow to prevent main drive motor overload.

Accordingly, it would be most desirable to be able to utilize an extruder to directly pretreat high-oil-content materials, yet at a sufficiently high throughput rate to more completely utilize the capacity of the extruder.

SUMMARY OF THE INVENTION

The present invention provides an extruder which operates at temperatures and pressures high enough to cause expansion of the product as it exits the die plate, yet which provides a means for draining oil liberated from the material during extrusion. The drainage is provided by including in the barrel wall a perforated or slotted section, downstream from a solid wall section, and preferably immediately before or close to the discharge die plate. Since the present invention allows (i) extrusion, (ii) expansion, and (iii) drainage of liberated oil, all in one extruder, it is highly suitable for use in the processing of oil-bearing materials with a high oil content.

The present invention further provides a new and improved feed worm arrangement for use in an extruder. Specifically, the present invention provides a long-pitch, double-wrap feed worm for initially advancing material dropped into the extruder through a feed hopper, followed by one or more intermediate pitch transition worms, feeding thence into the compaction worms. Such an arrangement allows the extruder to handle two to three times the volumetric intake of a similar extruder using conventional feed worm flighting, and thus to achieve a greater overall throughput.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
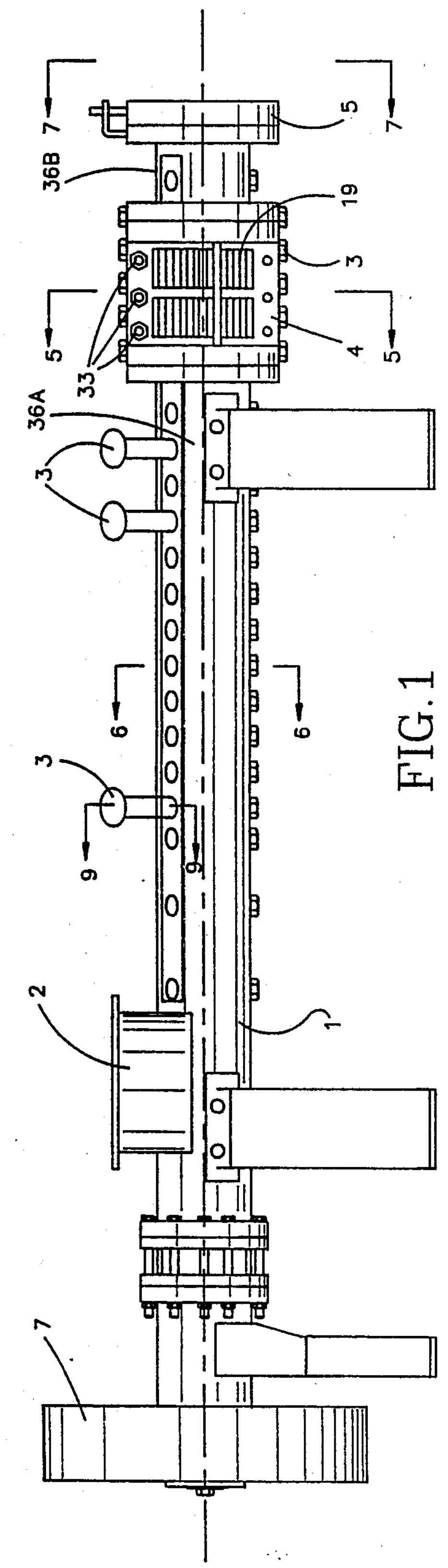
FIG. 1 is an elevational view of an extruder in accordance with the present invention.

The oilseed material is prepared ahead of the expander/extruder by cleaning; cracking, or granulating, if the particles are large; conditioning with some moisture, usually (but not always) adjusting the internal moisture level within the oilseed to approximately 9-11%; elevating the temperature to 120°-150° F. (for some of the oilseeds, but not all); and rolling, or flaking the oilseed, or grinding.

The processed oilseed is then passed through the apparatus of the present invention into which is injected some live steam, and by which some heat is generated by friction of he shaft pressing against the oilseed. The steam and heat cause a portion of the solid matter in the oilseed to become sticky and elastic, while the apparatus maintains the oilseed in a compressed state, even compressing the steam vapor into liquid water which absorbs into the solid matter of the oilseed. While the material is under pressure within the apparatus, if some of the contained oil is released from the tissue, it can drain from the compressed oilseed material through the slotted section of barrel wall near the discharge end of the apparatus.

The partially deoiled material then flows through openings at the discharge end of the apparatus into the lower pressure environment outside of the apparatus. Some of the moisture embedded within the material then flashes into steam because of the lower pressure, and inflates or expands the oilseed material with small cavities as the material swells because of its sticky and elastic condition. The released steam vapor creates small escape cavities and tunnels as it finds its way to the surface and escapes. The oilseed material then cools and stiffens because of the loss of moisture, but does not collapse to close off the cavities. The cavities are very important in the subsequent treatment of the material in a solvent extractor, because the solvent flows through the pores, and cavities, and extracts out the oil, or fat, remaining in the oilseed. Such expansion from an extruder is discussed in U.S. Pat. No. 3,255,220, the disclosure of which is hereby incorporated by reference.

If the oilseed material did not expand, or if the pores collapsed after they were formed, the oilseed material would not release its oil so readily in the solvent extractor. If the oilseed material were not elastic enough to stretch and expand when the moisture flashed, the oilseed material would merely crumble apart into small particles as the moisture flashed, and the small particles would present problems by preventing adequate flow of solvent through a bed of the oilseed material in the extractor. If the drainage section of the barrel wall were not provided, the apparatus could not properly treat high-oil-content material.

An important result of the present invention, therefore, is to have the material expand, or inflate, with pores and not merely extrude in a dense condition as it exits from an extruder and also to allow for the drainage of oil liberated from the material being treated. The present invention provides for this to happen, making it possible to process in large quantities, in a one-step extrusion operation, high-oil-content materials such as cottonseed (29%); rape-seed (canola) (42%); sunflower meats (32%); peanut meats (48%); copra (65%); linseed (38%) and others.

FIG. 1 shows an extruder in accordance with the present invention and which includes a barrel 1, an entry aperture or feed hopper 2 to accept incoming oleaginous material for processing, and one or more steam metering valves 3 for the injection of steam directly into the oleaginous material within the barrel 1. Barrel 1 includes a drainage section 4 to allow liberated oil to flow out through the barrel wall, and a discharge die plate 5 through which the treated material flows. A standard cutter mechanism (not shown) may be mounted just outside the die plate, to cut the extruded solid material into pellets (or "collets").

Within the barrel 1 is an axially rotating shaft 6 (FIG. 2) with discontinuous worm flighting 6A. The shaft 6 is rotatable by means of a motor and a V-belt (not shown) attached to drive sheave 7 and thrust sleeve 8. Conventional bearings 9 are provided within a thrust case 10 at the feed end of the shaft.

The shaft 6 carries a feed worm 11 having a relatively long pitch and with double wrap to increase its efficiency. Shaft 6 also carries two transition worms 12 and 13 with pitches selected to accept the solid material from the feed worm 11 and to allow any entrapped air to escape back through the entry aperture 2. Thereafter, the shaft carries a succession of compression worms 14, 15, 16, etc. which subject the material being processed to a continual build-up of pressure as the material is transported down the length of the barrel.

Figure 2:
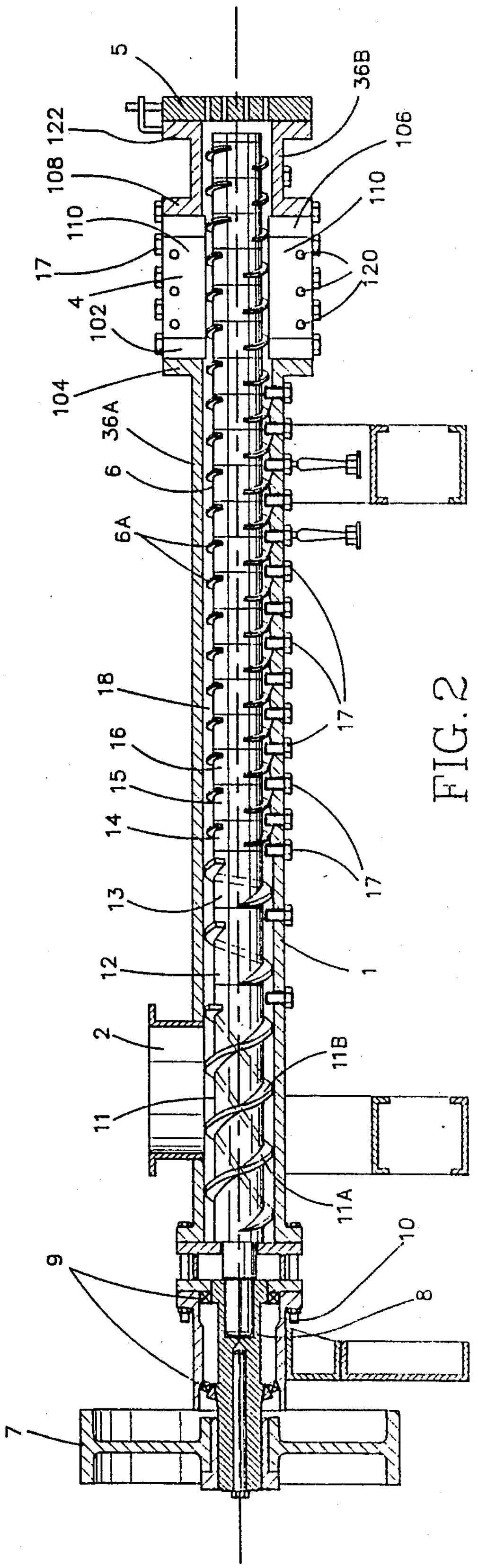
FIG. 2 is a partial sectional view of the extruder of FIG. 1, taken along lines 2—2 of FIG. 1.

The extruder according to the present invention preferably includes, between the individual worm flights 6A, one or more rows of inwardly extending breaker pins 17 (FIG. 2). Breaker pins 17 extend inwardly into barrel 1 and prevent rotary motion of the oleaginous material within the channel area 18 between shaft 6 and barrel 1. This furnishes a high degree of relative motion between the material within the breaker pin area and that within the flight area of each compression worm.

Drainage Section Design

Figure 4:
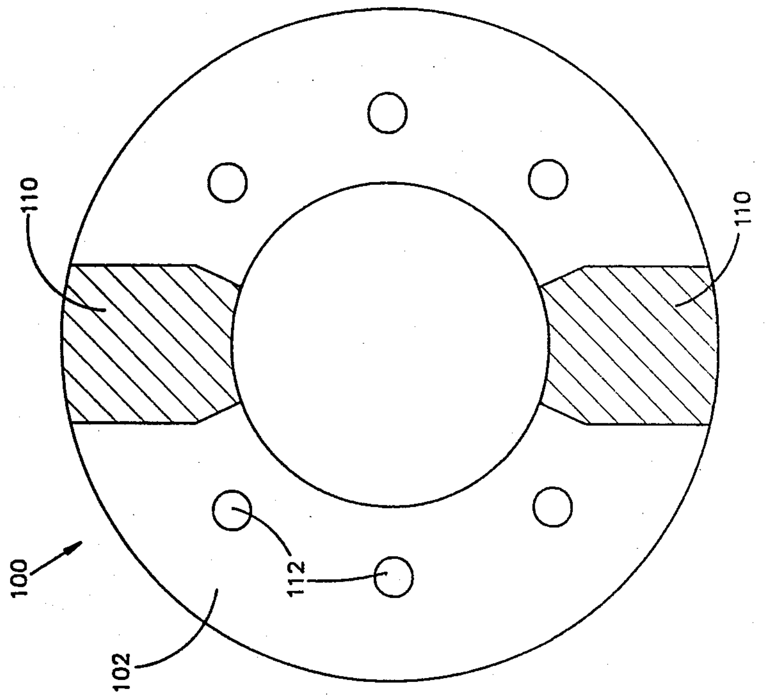
FIG. 4 is a sectional view taken along line 4—4 of FIG. 3.
Figure 3:
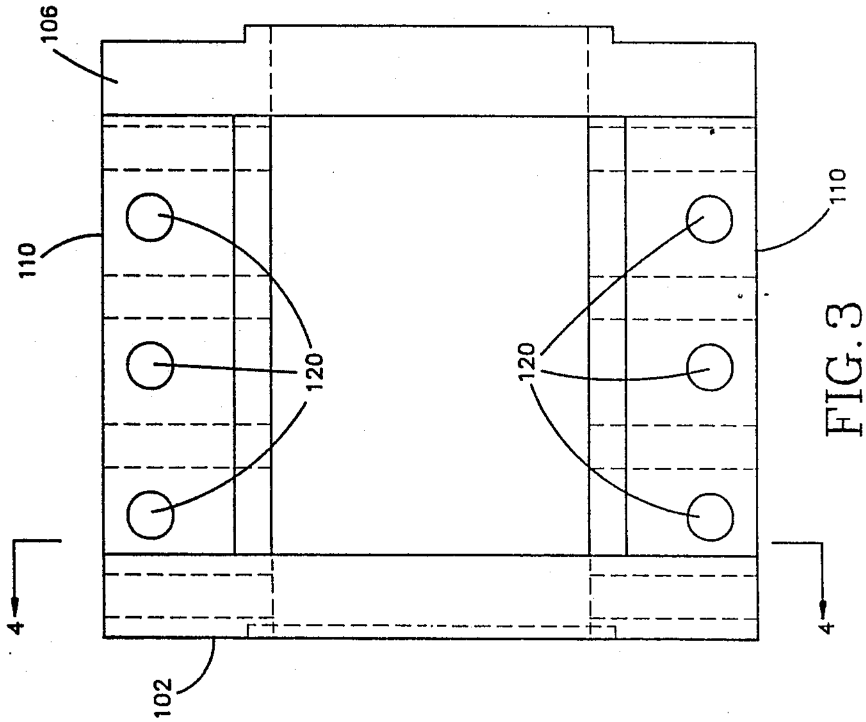
FIG. 3 is a sectional view of the drainage section frame member of the extruder of FIG. 1, with its drainage cages removed.
Figure 6:
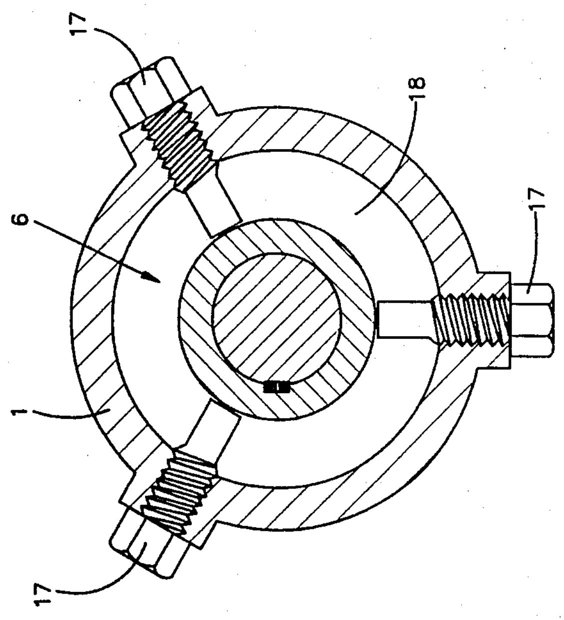
FIG. 6 is a sectional view through the solid wall barrel section of the extruder of FIG. 1, taken along lines 6—6 of FIG. 1.

The basic structure of the drainage section 4 includes a frame element 100 (FIG. 3) which has at one end a first flange 102 for attachment to an upstanding flange 104 (FIG. 2) on solid wall barrel section 36A; a second flange 106 at the opposite end of element 100 for attachment to a flange 108 on solid wall barrel section 36B; and a pair of longitudinally extending support posts 110 extending between flange 102 and flange 106. First flange 102 (FIG. 4) is provided with a plurality of bolt holes 112 for receiving bolts (not shown) which secure first flange 102 to barrel section 36A. Similarly, second flange 106 includes a plurality of bolt holes (not shown) for securing second flange 106 to solid wall section 36B.

The drainage section 4 (FIG. 5) of the barrel wall is built up from an assembly of barrel bars 19 lying side-by-side, fitted together in keystone-like fashion. The barrel bars 19 are held in place by tapered gib bars 20, 21 which are pulled down between the barrel bars by means of threaded studs 22, 23 and locking nuts 24, 25. The gib bars 20, 21 are attached to a series of frame members 26, 27 and, when pulled down, put lateral pressure on the barrel bars wedging them firmly in place in the frame members 26, 27.

Figure 5:
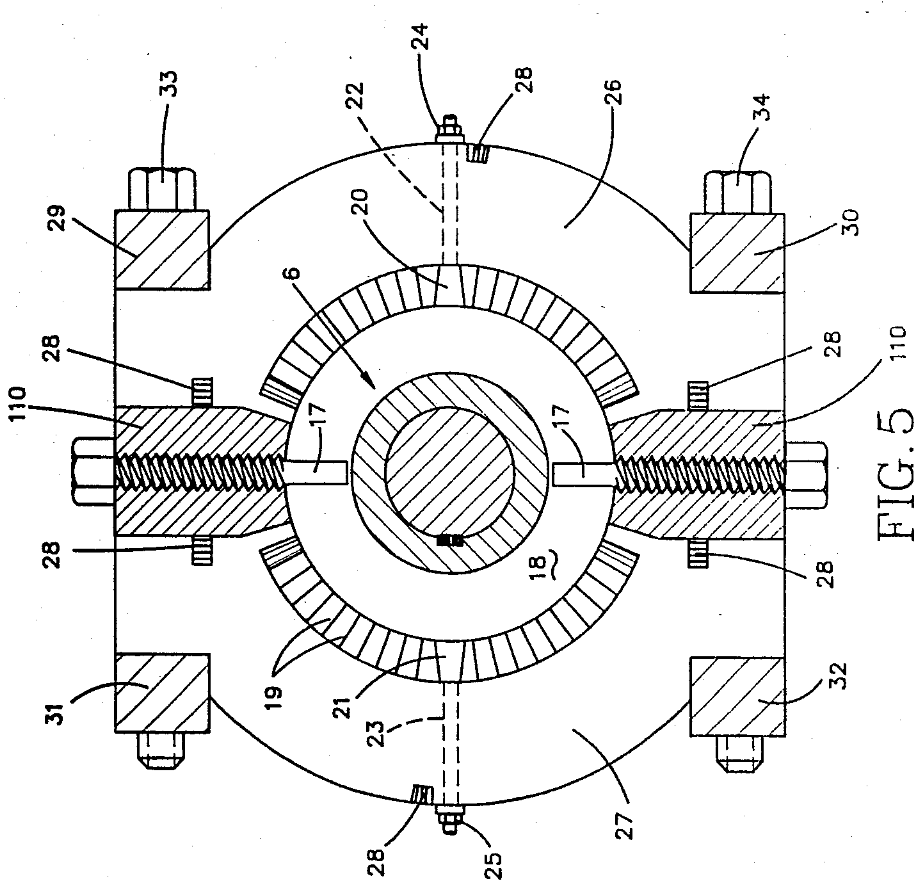
FIG. 5 is a sectional view through the drainage section of the extruder of FIG. 1, taken along lines 5—5 of FIG. 1.

The actual drainage cages of drainage section 4, which are half-cylindrical cage assemblies, left and right as seen in FIG. 5, are assembled onto frame member 100. As seen in FIG. 5, a series of upper tie bolts 33 and lower tie bolts 34 cooperate with four longitudinally extending clamping bars 29, 30, 31 and 32 to clamp frame members 26 and 27 onto opposite sides of the longitudinally extending support posts 110 of frame member 100. Tie bolts 33, 34 extend through bolt holes 120 in support ports 110.

The structure of drainage section 4, as thus described, makes several maintenance operations readily performable. For example, should the drainage spaces between barrel bars 19 become clogged, the drainage cages may simply be removed from the frame element 100 for cleaning, without disassembling the extruder as a whole. Also, should the wormshaft 6 require maintenance, breaker bolts 17 in drainage section 4 and/or in solid wall barrel section 36A, 36B may be removed, allowing the shaft 6 to be pulled out axially.

The flanges 102 (FIG. 2) and 106 on drainage section 100; the flange 104 on barrel wall 36A; and the flange 108 on barrel wall 36B; are all interfitting so that the drainage section 4 may be interchanged, for example, with the barrel wall section 36B; the die plate 5 may be bolted directly to drainage section 4; or further drainage sections 4 or solid barrel wall sections 36B may be added as desired. Such interchangeability allows for great flexibility in assembling an extruder according to the present invention to fit a particular application.

Figure 10:
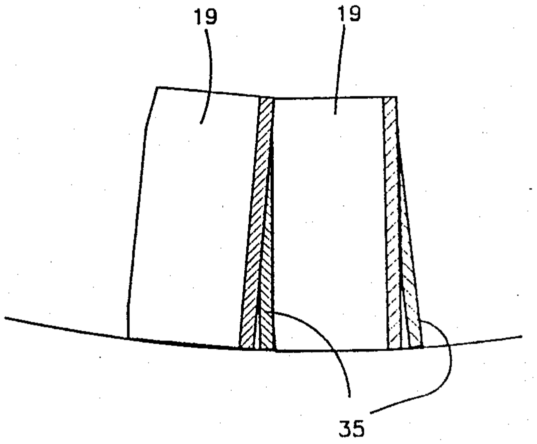
FIG. 10 is an enlarged view showing the detail of the spacers positioned between the drainage section barrel bars of the extruder of FIG. 1.

The barrel bars 19 are disposed in such close lateral contact with each other as to prevent solid material from escaping radially therebetween, but to permit liquid to be squeezed through the minute interstices formed by placing spacers 35 (see FIG. 10) between adjacent barrel bars 19.

The drainage section 4 may advantageously be mounted at different positions along the barrel 1. It may be mounted, as shown in FIG. 1, after the solid walled section 36A and before the final solid wall section 36B. Alternatively, the drainage section 4 may be interchanged with the final solid wall section 36B of the barrel to provide drainage immediately ahead of the die plate 5. There may also be provided a longer solid-walled discharge section 36B between the drainage section 4 and the die plate 5. For materials which when processed produce relatively high levels of liberated oil, two drainage sections 4 placed end-to-end, or one section of longer length, can be used.

Figure 8:
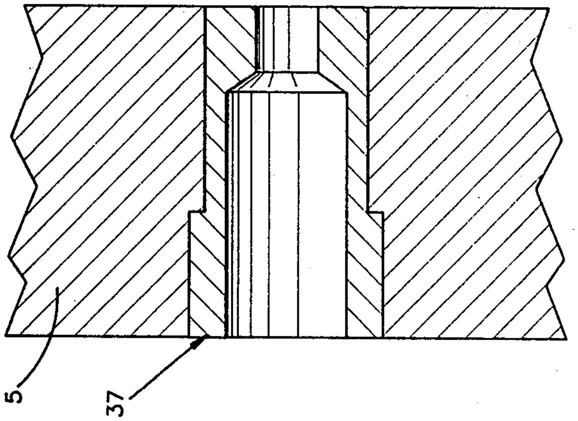
FIG. 8 is an enlarged fragmentary sectional view taken along lines 8—8 of FIG. 7, showing the cross section of the die orifice.
Figure 7:
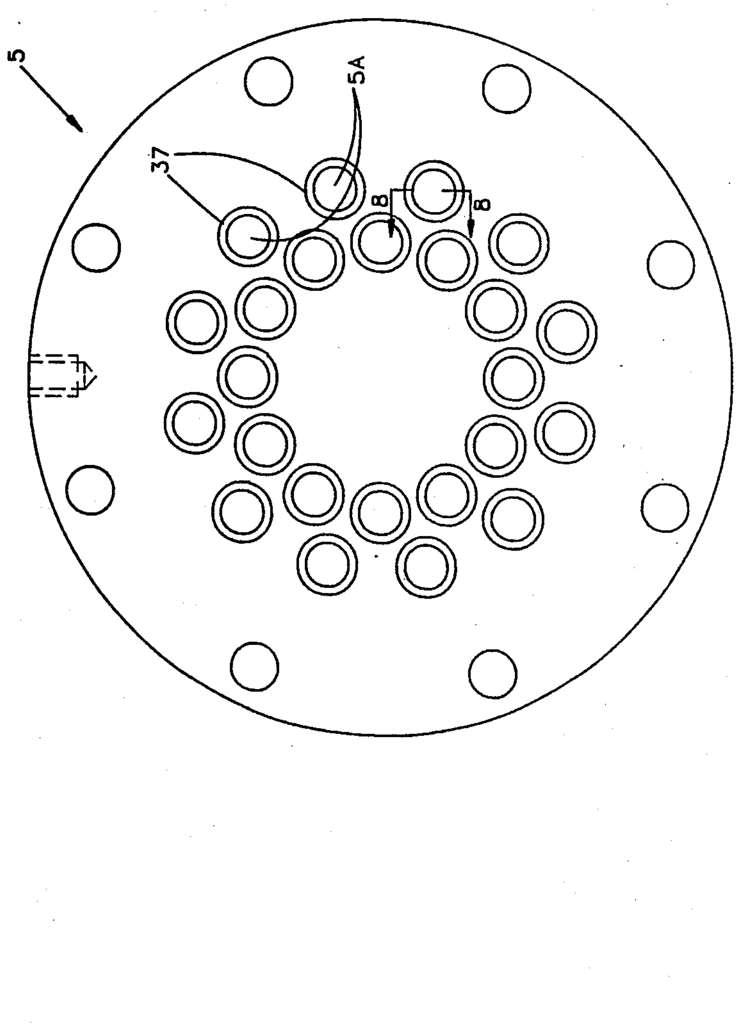
FIG. 7 is an end view of the exit die plate of the extruder of FIG. 1, taken along lines 7—7 of FIG. 2.

At the discharge end of the barrel 1 is a die plate 5 (FIGS. 1, 7) which is bored to provide a plurality of reduced exit apertures 5A, having shoulders which serve to retain die inserts 37 (shown in FIG. 8). By this means, dies of different aperture diameters and land lengths and number of apertures per insert may be substituted.

Figure 9:
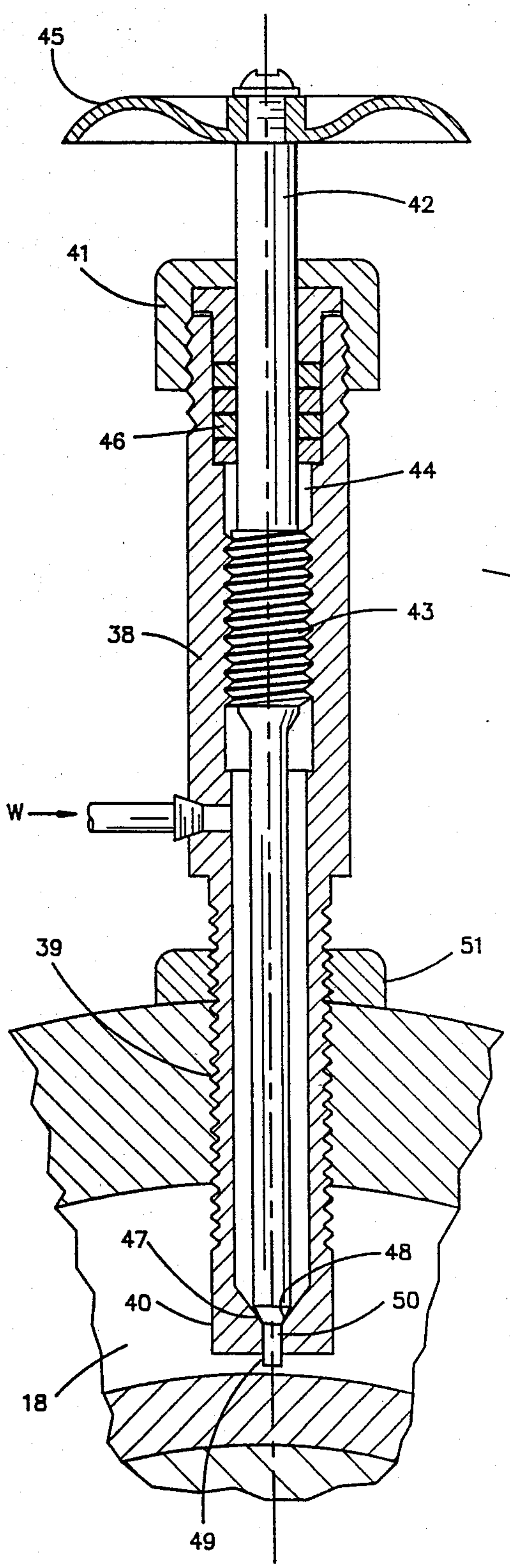
FIG. 9 is a vertical sectional view of a steam metering valve used in the extruder of FIG. 1.

Since it is preferable to increase the moisture content (when required) of the oleaginous material being processed, by the injection of steam, and since it is preferable to furnish a high percentage of the BTUs required for heating of the oleaginous material by live steam injection, the present invention may employ one or more steam injection valves 3 (FIGS. 1 and 9) for such injection. Steam injection valve 3 includes a housing 38 having a threaded portion 39 adapted to interfit one of the threaded apertures such as are occupied by breaker pins 17 as shown in FIG. 2. The housing 38 also has a nonthreaded portion 40 which extends inwardly into the channel 18.

The housing 38 is hollow and is provided at the outwardly directed end thereof with a thread fitted cap 41. A valve stem 42 is mounted concentrically within the housing 39. The valve stem 42 has an intermediate threaded portion 43 thread fitted within a bore 44 of said housing. The valve stem projects outwardly from the intermediate portion 43 through an aperture in the cap 41, and is provided at its outermost end with a handle 45. Packing 46 is compressed under the cap 41 whereby the stem 42 is sealed in relation to the bore 44.

The valve stem 42 is diametrically reduced at its inwardly directed portion and is provided at the end thereof with a frustoconical valve closure member 47 which has a complementary interfit with the frustoconical valve seat 48. A small, cylindrical plunger 49 extends coaxially inwardly from the valve closure member 47 and closely interfits a small, cylindrical bore 50 in the innermost end of the housing. The interfit between the small plunger 49 and the bore 50 is preferably such that when the valve closure 47 is unseated by turning the handle 45, pressurized steam may be admitted at W and forced past the piston 49 to enter into the channel 18, but the material being processed cannot easily enter the interior of the injection valve from the barrel. The position of the discharge end of the injection valve relative to the hub surface of the shaft 6 is controlled by a threaded nut 51 used to lock the valve in position on the barrel.

For injecting water or steam, at W, into an oleaginous material being processed in the extruder according to the present invention, valve 3 may be employed in place of one of the breaker bolts 17 toward the inlet end of the apparatus, or as an alternative, water could be added directly into the feed hopper 2. When valve 3 is being employed for steam injection, it advantageously replaces a breaker bolt 17, preferably in the area approximately one-half to three-quarters of the way along the length of the apparatus toward the discharge end, as shown in FIG. 1.

Feed Worm Design

As noted above, the processing of flaked oilseeds in present extruders is not nearly as efficient as it could be, because of the relative inefficiency of the feed worm structure as compared to that of the compaction worms. That is, present feed worm designs cannot feed enough solids to make full use of the compaction worm's capacity. Accordingly, it has long been desired to find a feasible way to increase feed worm capacity.

There have been proposed various ways to do this. One way is to provide a force feeder which would increase the efficiency of the feed worm. (Gravity fed feed worms are only about 33% efficient—that is they actually convey about 33% of what they could theoretically convey. This is because of the open hopper above the feed worm and the tendency of the feed material to pile up and fall behind the flight as the shaft rotates.) However, a force feeder adds significantly to the cost of the extruder.

Another way to increase feed worm capacity is to make the barrel diameter larger at the feed end, and funnel it down to the narrower working diameter farther down the barrel. This would allow for more volume to be conveyed because the feed worm flights would be deeper, but this would again add significantly to the cost of the extruder.

Accordingly, the present invention provides for increasing feed worm intake, not by the use of a force feeder, and not by enlarging the barrel diameter, but rather by lengthening the pitch of the feed worm. This presents the problem, however, that a long pitch flight of shallow channel depth (the distance between the hub of the shaft and the inside of the barrel) makes the worm even less efficient than a shorter pitch flight, and makes it more difficult for the entrapped air coming in with the flakes to flow back, counter-current to the flow of flakes, so that the air can escape out of the feed hopper. If the air cannot escape back through the feed hopper, it will become trapped in the extruder and prevent an adequate throughput of flakes. Accordingly, the present invention uses double flighting on the feed worm to allow for increased capacity, due to the long pitch, with no significant loss of efficiency due to the double wrap; and, further, uses one, or preferably a pair of decreasing pitch transition worms between the high volume feed worm and the existing compaction worms in the original extruder shaft configuration.

An earlier design feed worm had a single flight feed worm with wraps spaced four inches apart and at a pitch of four inches. The compaction worms had a pitch of 2½ inches. The volumetric displacement of the compaction worm was 41.7% less than the displacement of the feed worm. It was known from the operation of the original extruders that the air could flow counter current to the solid material with that much reduction in volumetric displacement between the feed worm and the press worm.

The present invention provides a new feed worm 11 with about 2½ times the capacity of the original feed worm and yet which still allows for the escape of air therethrough. Keeping the hub diameter and the barrel inside diameter the same requires a pitch of 10½ inches. Using a double wrap allows the flights 11A, 11B to be 5¼ inches apart, which is close enough to the original 4 inches not to cause a significant decrease in efficiency.

This new design provides a 78% reduction in volumetric displacement going from the feed worm to the compaction worm, which, however, standing alone, is too much to allow for the free flow of trapped air to escape back through the feed worm 11 to the feed hopper 2. Therefore, one, or preferably two transitional worms 12, 13 are disposed between the feed worm 11 and the compaction worms 14, 15, 16, etc. The transition worms 12, 13 are designed, with careful attention to volumetric displacement, to allow for a stepwise reduction in volumetric displacement from worm-to-worm that was not substantially different than the 41.7% known to be adequate to allow backflow of entrapped air; and yet, allows each worm to have 320° of wrap and interfit with as many of the existing breaker bolts 17 in the existing barrel 1, as possible.

FIG. 2 illustrates the new and improved extruder feed worm design in accordance with the present invention. Disposed underneath the gravity feed hopper 2 is the feed worm 11. Feed worm 11 is a long-pitch, double-wrap worm having flights 11A and 11B. The feed worm 11 is followed by two decreasing pitch transition worms 12 and 13. The new worm design provides for a volumetric displacement reduction of 42.2% from feed worm 11 to transition worm 12; of 44.1% from transition worm 12 to transition worm 13; and 32.1% from transition worm 13 to compaction worm 14. This allows for a total volumetric displacement reduction from the feed worm to the compaction worm of 78%, but it is done stepwise in three increments that are not substantially different from the 41.7% known to be adequate.

Operation

In operation, the oleaginous material to be processed is fed into barrel 1 via feed hopper 2. Feed worm 11 and transition worms 12, 13 initially convey the solid material along barrel 1. The design of the feed worm 11 and transition worms 12 and 13 is such that a large volume of low bulk density flakes ca be accepted into the compression barrel 1 by the initial long pitch, double flighted worm 11 which will pass the flakes on to one or more transition worms 12 and 13. Transition worms 12 and 13 will, by means of progressively reduced pitch, and discontinuous wrap, begin the compaction and de-airing of the flakes, allowing the air which filled the voids between the flakes, to flow counter-current, back through the feed hopper 2, and propelling the de-aired material into the area of the compaction worms 14, 15, 16, etc. which compress the material to an increasing degree along the length of the barrel.

If the raw material being fed into barrel 1 is too dry, for example, if it is at a moisture content of less than approximately 6%, water is either injected by means of valve 3 inserted into, for example, the fourth breaker bolt opening from the feed end of the machine, or is piped directly into the feed hopper 2. Sufficient water is thus added to raise the moisture content of the materials to preferably the range of 6%–8%. As the material is conveyed along barrel 1 through the relatively narrow channel 18 between the shaft 6 and barrel 1 (FIG. 2), a frictional heat is evolved as a result of the relative motion between the shaft 6 and the solid material being processed. As a consequence, the temperature of the solid material is increased during its course of travel through the apparatus. Live steam may then be injected into the solid mass through one or more valves 3, located in breaker pin openings past the center half of the barrel 1. Enough steam is injected into the solid material so that the moisture content of the material just ahead of the die plate 5 is preferably in the range of 10% to 13%, but permissible in a range of 7% to 20%. Collets can be made at still higher moisture content, but it is preferred not to operate at such high moisture levels because of the requirement to dry the collets before they enter the solvent extractor.

By addition of the live steam, the temperature of the solid material (as measured by a thermometer reading the temperature of the solid material near the barrel wall, not at the hotter location adjacent the worm shaft) is also increased. That, in conjunction with the heat generated by friction, can raise the temperature of the material to the preferred range of 200° F. to 250° F., but permissible in a range of 190° F. to 300° F. Dry steam, if used, especially at temperatures in excess of 212° F., achieves a most efficient increase in the temperature of the oilseed material.

The design of the compression worms 14, 15, 16, etc. and the design and selection of die inserts 30 (FIG. 7) are such that the mechanical pressure imposed upon the solid material is higher than the steam pressure generated within the material. As a consequence, any moisture content within the solid material is maintained in the liquid state. By maintaining this moisture in the liquid state, a higher rate of heat transfer is realized between the shaft and the solid material.

There is a gradual buildup of pressure along the length of the barrel 1. At the feed hopper the pressure is atmospheric. In a machine which might be constructed in accordance with the present invention, the barrel 1 would be eight feet in overall length. About three feet into the barrel, where water may be injected, the pressure would be 40 to 100 psi. About five feet into the barrel, where steam may be injected, the pressure would be about 100 to 150 psi. There is a rather sharp rise in pressure along the last three feet of the barrel usually resulting in final pressures of 200 to 600 psi at the die plate, but the full range is 100 to 1000 psi at the die plate.

The pressure within barrel 1 is a dynamic pressure exerted upon the material by the rotating shaft 6, but allowing for a backflow of some of the material along the pie shaped openings on the wrap of the worms 6A. (There is only 320° of wrap, leaving 40° with no wrap.) The amount of backflow is dependent upon the softness or stiffness of the material being extruded. The softness or stiffness is influenced by the moisture level of extrusion, and by the oil (or other lubricant) level of the material. The backflow would immediately allow the pressure to adjust itself so that there is always a pressure gradient going from a low value progressively towards a higher value at the die plate.

Even in the area of the drainage section 4, the pressure in the extruder barrel 1 is to an extent self-regulating. The pressure inside the barrel 1 upon the material being processed is constantly increasing as the material advances from the inlet opening 2 toward the die plate 5 at the end of the barrel 1. The openings in the wall of drainage section 4 are sized so as to allow for the passage of liquid (liberated oil) with only a minimum escape of solids. As the pressure in the barrel 1 increases, more oil flows out of the openings in the drainage section 4, thereby reducing the volume of compressed material within the barrel 1, which loss would tend to reduce the pressure at that point. But, because of backflow, the overall barrel pressure is smoothed out so that there is still a progressive increase in pressure as the material advances through the barrel, but the magnitude of the pressure is not as great as it would have been had none of the oil passed through the drainage section 4.

Because of the pressure imposed upon the material, some of the oil imbedded in the oilseed material is liberated during the working of the material. Some of this liberated oil may be re-absorbed into the solid material. However, if the overall oil content of the material is higher than approximately 30%, some oil would remain liberated in pockets of free oil that would interfere with the steady-state discharge of collets through the dies. For those oilseeds that present this problem, such as cottonseed, which contains approximately 30% oil and occasionally presents this problem, or other oilseeds containing more than 30% of oil, which oilseeds would usually present this problem, the present invention with the drainage section 4 allows drainage of the oil from the barrel 1. This drainage section 4 can be located anywhere between the midpoint of the barrel 1 and the die plate 5, but is preferably disposed at a point about three-fourths of the distance downstream from the inlet 2 of the extruder (one-fourth of the distance upstream of the die plate 5). The drainage section 4, as noted above, could extend up to the area of the die plate 5, or it could terminate some distance from the die plate 5. The drainage section 4 may be located in a portion of the extruder wherein the vapor pressure of the water content of the material being processed significantly exceeds atmospheric pressure, and it will still function properly.

One preferred embodiment of the apparatus of the present invention provides for the last quarter of the overall length of barrel 1 to be a removable section, one-half of which is perforate to allow for drainage, the other half solid-walled. Such a section of barrel wall may be provided in two versions: one with the drainage section 4 adjacent to the die plate 5, the other with the solid wall adjacent to the die plate 5. Or, as an alternate, this section can, by judicious spacing of the positions therealong of breaker bolts 17, be made to be reversible so that it can, itself, be placed in either orientation.

It is not an object of the present invention per se to cause a liberation of oil but, rather, to form a porous extractable collet; and, if in doing that, some of the oil is liberated, to provide a means for the liberated oil to escape from the interior of the extruder in a fashion that allows the extruder to continue discharging collets in a steady-state condition. The liberated oil is preferably directed to a point outside the extruder where it can be collected and passed downstream to the oil processing equipment in the solvent plant. One way to do this is to provide a shroud around the drainage area of the barrel, with a built in sump at the bottom (shroud and sump not shown in the figures), the oil from the sump being pumped to join the desolventized extracted oil prior to filtration. If there is a small quantity of oil, or if the oil contains more solids than the filter can handle, it can be pumped into the extractor after the collets have formed a bed to let the solids be filtered out by the collets as the oil passes down through the bed. Or the oil can be passed over a screen to free drain the solids, the solids then being mixed in with the material entering the extruder for reagglomeration. The screened oil, which is pressed rather than solvent extracted, contains fewer impurities, because pressing removes primarily triglycerides, which is the vegetable oil desired, whereas the solvents used in extraction remove other lipid compounds, such as phosphatides and waxes which are difficult to remove from the finished product. For this reason, press oil can find a preferred market in some applications over extracted oil. The use of the present invention would allow for a stream of this higher quality oil to be diverted into a special, higher priced market.

The term "oil" is used herein to refer generally to fluid which is liberated from the solid material being treated in the extruder and allowed to drain out. It should be noted that the oil may be a fat or other lipid, or a liquid wax, or other fluid oil-like component which is so liberated, depending on what material is being processed. Thus, use of the term "oil" herein when referring to the present invention is intended to encompass any such liberated material.

Even if the drainage section 4 is disposed along the barrel 1 at a high pressure region thereof, most of the moisture or water will stay in the solid material while the oil drains out. Some of the solid material with its absorbed moisture will escape along with the liberated oil, but this can be kept at an acceptably low level by a judicious choice of barrel bar spacing.

The length of time for a material of the type hereinabove identified to be processed through an apparatus as shown herein may be in the range of 10 to 30 seconds. Although the specific length of time in process is not critical, a relatively short residence time, as is possible with the present invention, will help in reducing any deleterious side effects resulting from relatively high temperatures for sustained periods of time on the oleaginous material being processed.

The solid material just ahead of die plate 5 might be at a moisture content of 13% and at a temperature of 110° C. under a mechanical pressure in the range of 100 to 1,000 p.s.i., but preferably in a range of 100 to 300 p.s.i. Upon discharging from the apparatus through the apertures in die plate 5 into normal atmospheric pressure, there is an instantaneous pressure drop so that some of the water in liquid form vaporizes, thus causing an expansion of the issuing solid material, which results in a porous structure of such material. Further, by converting water in the liquid state to a vapor state there is a decrease in moisture of the solid material with a simultaneous cooling of the material. Because of the porous nature of the solids, they may continue to evaporate moisture, and may more readily be permeable for the leaching action of solvent in a solvent extractor to extract the oil from the oleaginous material.

From the above description of a preferred embodiment of the invention, those skilled in the art will perceive improvements, changes and modifications. Such improvements, changes and modifications within the skill of the art are intended to be covered by the appended claims.

Having described a preferred embodiment of the invention, I claim:

1. An extruder for treating oil-bearing material having a water content, comprising:

an elongate enclosure having an inlet end and a discharge end;

means for working and advancing the material through said enclosure from said inlet end to said discharge end while (i) producing an increase in the vapor pressure of the water in the material as it advances, so as to achieve a vapor pressure significantly in excess of atmospheric pressure as the material approaches the discharge end, and (ii) producing an increasing mechanical pressure on the material sufficient always to prevent vaporization of the water in the material while the material is in said enclosure; and means for discharging the material from said discharge end into a zone of reduced pressure to cause vaporization of the water in the material and expansion of the material;

wherein said enclosure comprises a solid wall section and also comprises a perforate wall section disposed between said solid wall section and said discharge end of said enclosure.

2. An extruder as defined in claim 1 wherein said perforate wall section of said enclosure is disposed adjacent to and extends up to said discharge end of said enclosure.

3. An extruder as defined in claim 1 wherein said enclosure further comprises a second solid wall section disposed between said perforate wall section and said discharge end of said enclosure.

4. An extruder as defined in claim 1 wherein said means for working and advancing the material comprises a worm shaft having a plurality of individual worm flights thereon, said extruder further comprising a plurality of breaker pins extending inwardly from said solid wall section of said enclosure between individual ones of said plurality of worm flights.

5. An extruder as defined in claim 4 wherein at least one of said plurality of breaker pins is replaced with moisture injection means.

6. An extruder as defined in claim 5 wherein said moisture injection means comprises means for injecting steam into the interior of said enclosure to increase the moisture content and temperature of material therein.

7. An extruder for treating oil-bearing material having a water content, comprising:

a barrel formed with a barrel wall having an inlet end and an outlet end;

a rotatable wormshaft disposed within said barrel and extending between said inlet end and said outlet end;

a worm assembly on said wormshaft to advance and work material passed through the barrel from said inlet end to said outlet end;

said outlet end of said barrel including surface means defining a restricted orifice;

said barrel wall including a solid barrel wall section and a perforate barrel wall section disposed between said solid barrel wall section and said outlet end of said barrel; and means for raising the vapor pressure of the water in the material to significantly in excess of atmospheric pressure while maintaining all water in said barrel in the liquid phase.

8. An extruder as defined in claim 7 wherein said perforate wall section of said enclosure is disposed adjacent to and extends up to said discharge end of said enclosure.

9. An extruder as defined in claim 7 wherein said enclosure further comprises a second solid wall section disposed between said perforate wall section and said discharge end of said enclosure.

10. An extruder as defined in claim 7 wherein said means for working and advancing the material comprises a worm shaft having a plurality of individual worm flights thereon, said extruder further comprising a plurality of breaker pins extending inwardly from said solid wall section of said enclosure between individual ones of said plurality of worm flights.

11. An extruder as defined in claim 10 wherein at least one of said plurality of breaker pins is replaced with moisture injection means.

12. An extruder as defined in claim 11 wherein said moisture injection means comprises means for injecting steam into the interior of said enclosure to increase the moisture content and temperature of the material being treated therein.

13. An extruder for treating oil-bearing material, comprising:

an elongate housing defining a longitudinally extending bore therein;

means defining a material inlet opening in said bore adjacent to one end of said bore;

means defining a material discharge opening in said bore at the other end of said bore;

screw conveyor means disposed in said bore for moving the material being treated from the material inlet opening to the material discharge opening, said screw conveyor means including in succession first worm means and second worm means;

said first worm means being disposed in a first, solid-wall section of said housing and being operative to move the material from a location adjacent the inlet opening to said second worm means;

said second worm means being at least partially disposed in a second section of said housing and being operative to move the material from said first worm means to the discharge opening and to compress the material so that the material is under an increasing mechanical pressure as it is moved from said first worm means to the discharge opening;

said second section of said housing including a perforate wall section for draining oil from said bore; and means for raising the vapor pressure of the water in the material to significantly in excess of atmospheric pressure while maintaining all water in said housing in the liquid phase.

14. An extruder as defined in claim 13 wherein said perforate wall section of said enclosure is disposed adjacent to and extends up to the end of said enclosure having said discharge opening therein.

15. An extruder as defined in claim 13 wherein said enclosure further comprises a second solid wall section disposed between said perforate wall section and the end of said enclosure having said discharge opening therein.

16. An extruder as defined in claim 13 wherein said second worm means comprises a worm shaft having a plurality of individual worm flights thereon, said extruder also including a plurality of breaker pins extending inwardly from said first solid wall section of said enclosure between individual ones of said plurality of worm flights.

17. An extruder as defined in claim 16 wherein at least one of said plurality of breaker pins is replaced with moisture injection means.

18. An extruder as defined in claim 17 wherein said moisture injection means comprises means for injecting steam into said bore to increase the moisture content and temperature of material therein.

19. An extruder for treating oil-bearing material having a water content, comprising:

an elongate enclosure having an inlet end and a discharge end;

means for working and advancing the material through the enclosure from said inlet end to said discharge end while (i) producing an increase in the vapor pressure of the water content of the material as it advances so as to achieve a vapor pressure significantly in excess of atmospheric pressure at least at a first location along said enclosure, and (ii) producing an increasing mechanical pressure on the material while the material is in the enclosure sufficient to prevent vaporization of any water content in material in said enclosure; and means for discharging the material from said discharge end into a zone of reduced pressure to permit vaporization;

said enclosure including means for draining oil from said enclosure during the working of the material, said draining means being disposed at least at said first location along said enclosure.

20. An extruder as defined in claim 19 wherein said perforate wall section of said enclosure is disposed adjacent to and extends up to said discharge end of said enclosure.

21. An extruder as defined in claim 19 wherein said means for draining oil from said enclosure comprises a wall section of said enclosure having a plurality of openings extending therethrough.

22. An extruder as defined in claim 19 wherein said enclosure comprises a solid wall section and a perforate wall section, and wherein said means for draining oil from said enclosure comprises said perforate wall section, and wherein said enclosure further comprises a second solid wall section disposed between said perforate wall section and said discharge end of said enclosure.

23. An extruder as defined in claim 22 wherein said means for working and advancing the material comprises a worm shaft having a plurality of individual worm flights thereon, and said extruder further comprising a plurality of breaker pins extending inwardly from said solid wall section of said enclosure between individual ones of said plurality of worm flights.

24. An extruder as defined in claim 23 wherein at least one of said plurality of breaker pins is replaced with moisture injection means.

25. An extruder as defined in claim 25 wherein said moisture injection means comprises means for injecting steam into the interior of said enclosure to increase the moisture content and temperature of the material being treated therein.

26. An extruder comprising:

a barrel having an inlet and an outlet end;

a rotatable wormshaft disposed within said barrel and extending between said inlet and said outlet end, said wormshaft having a worm assembly thereon to advance and work material passed through the barrel from said inlet to said outlet end;

said worm assembly including in succession feed worm means, transition worm means, and compaction worm means;

said feed worm means including a double-flighted feed worm assembly having a first pitch;

said transition worm means including a transition worm assembly having at least one transition worm with a second pitch which is shorter than said first pitch;

said compaction worm means including a compaction worm assembly having a third pitch which is shorter than said second pitch.

27. An extruder as defined in claim 41 wherein said transition worm assembly includes first and second transition worms, said first transition worm having a longer pitch than said second transition worm, each of said first and second transition worms having a shorter pitch than that of said feed worm assembly, and each of said first and second transition worms having a longer pitch than that of said compaction worm assembly.

28. An extruder for treating oil-bearing material, comprising:

an elongate enclosure having an inlet end and a discharge end;

means for working and advancing the material through said enclosure from said inlet end to said discharge end while (i) producing an increase in the vapor pressure of the water in the material as it advances so as to achieve a vapor pressure significantly in excess of atmospheric pressure as the material approaches the discharge end, and (ii) producing an increasing mechanical pressure on the material sufficient always to prevent vaporization of the water in the material while the material is in said enclosure; and means for discharging the material from said discharge end into a zone of reduced pressure to cause vaporization of water in the material and expansion of the material;

wherein said enclosure comprises a solid wall section and also comprises a perforate wall section disposed between said solid wall section and said discharge end of said enclosure, and wherein said means for working and advancing the material comprises:

a rotatable wormshaft disposed within said enclosure and extending between said inlet and said discharge end, said worm shaft having a worm assembly thereon to advance and work material passed through the barrel from said inlet to said discharge end, said worm assembly including in succession feed worm means, transition worm means, and compaction worm means, said feed worm means including a double-flighted feed worm assembly having a first pitch, said transition worm means including a transition worm assembly having at least one transition worm with a second pitch which is shorter than said first pitch;

said compaction worm means including a compaction worm assembly having a third pitch which is shorter than said second pitch.

* * * * *